(12) United States Patent
Liu et al.

(10) Patent No.: US 7,356,084 B2
(45) Date of Patent: Apr. 8, 2008

(54) METHOD FOR TRACKING THE DISAPPEARANCE OF DETECTED LOGOS WITHIN DIGITAL VIDEO SIGNALS

(75) Inventors: Shan Liu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 798 days.

(21) Appl. No.: 10/682,315

(22) Filed: Oct. 9, 2003

(65) Prior Publication Data

US 2005/0078223 A1    Apr. 14, 2005

(51) Int. Cl.
  *H04N 7/18*    (2006.01)
(52) U.S. Cl. .................................. 375/240.26
(58) Field of Classification Search .............................. 375/240.11–240.29
  See application file for complete search history.

(56) References Cited

U.S. PATENT DOCUMENTS

| | | | |
|---|---|---|---|
| 5,920,360 A | 7/1999 | Coleman et al. | 348/700 |
| 6,061,471 A | 5/2000 | Coleman et al. | 382/173 |
| 6,084,641 A | 7/2000 | Wu et al. | 348/722 |
| 6,100,941 A * | 8/2000 | Dimitrova et al. | 348/700 |
| 6,542,544 B1 | 4/2003 | Takahashi et al. | 375/240 |
| 6,870,956 B2 * | 3/2005 | Qi et al. | 382/170 |
| 2003/0076448 A1* | 4/2003 | Pan et al. | 348/589 |

OTHER PUBLICATIONS

Webster's II New Riverside University Dictionary, Copyright 1984, 1988, p. 1141.*

* cited by examiner

*Primary Examiner*—Anand Rao
(74) *Attorney, Agent, or Firm*—Kenneth L. Sherman, Esq.; Michael Zarrabian, Esq.; Myers Dawes Andras & Sherman, LLP

(57) ABSTRACT

A method and system for sensing disappearance of the previously detected logos in noisy digital video signals. When a video program starts, a short period of time is allowed to initially detect the existence and the location of the logo within the incoming video frames. Once the logo is detected and a logo map is generated, logo tracking senses whether the logo remains in, or disappears from, the video frames. If the logo moves or (partially) changes its intensity, color, pattern, etc., it will be sensed as having disappeared altogether.

27 Claims, 5 Drawing Sheets

METHOD FOR TRACKING THE DISAPPEARANCE OF DETECTED LOGOS WITHIN DIGITAL VIDEO SIGNALS

FIELD OF THE INVENTION

The present invention relates to the field of digital video display, and more particularly, to a method for tracking the display and disappearance of detected logos.

BACKGROUND OF THE INVENTION

Increasingly, television broadcast signals include logos that are displayed on television screens over the broadcast programs as station identification. Typically, logos stay on the screen for considerably long periods of time without change in their intensities, colors, patterns and locations, etc. Hence, they may be annoying, and can cause problems such as the well-known screen burn on High Definition TV (HDTV) sets. As such, techniques have been developed for detecting the logos within the broadcast video signals, and removing or processing the logos to avoid the above problems.

On the other hand, the logos may disappear in some cases such as when the video programs change. Without promptly detecting the disappearance of the logo, and therefore stopping processing, annoying visual artifacts may result. Therefore, it is important to sense when the detected logo has disappeared. To that end, the pixel intensity value change has been examined to detect the fading of images in video signals, such as in U.S. Pat. Nos. 6,542,544; 6,084,641 and 5,245,436.

In U.S. Pat. No. 5,245,436, the pixel means of a frame and its previous frames are calculated and then the relative mean change between the means is determined to detect the fading of an image. Although the mean change can be extensively applied to detecting the fading/disappearance of a logo, such a method is not robust when the video signal contains noise. As such, more comprehensive measurements must be undertaken. Similarly, U.S. Pat. Nos. 6,542,544 and 6,084,641 present different approaches to detecting fading of images in video signals. However, neither considers the impact of noise.

Indeed, almost all video signals in the real-world applications contain noise (some at considerably high levels). There is, therefore, a need for a method and system for tracking and detecting the disappearance of logos within noisy video signals.

BRIEF SUMMARY OF THE INVENTION

The present invention addresses the above needs. In one embodiment the present invention provides a method of detecting fade in an area of each of a sequence of frames comprising pixels that represent digital video images. The method includes the steps of: calculating a stochastic measure $\sigma_d$ of said area based on the standard deviation of differences in pixel values in at least two of said frames; and detecting fade in said area by comparing the stochastic measure $\sigma_d$ with a given noise level, such that if the difference between $\sigma_d$ and the noise level is greater than a threshold value then fade is detected.

Calculating the stochastic measurement $\sigma_d$ can further include the steps of: (a) for each pixel in the current frame: (i) determining if the pixel belongs to logo area; (ii) if so, calculating the difference between the value of the current pixel and that of a corresponding pixel in a reference frame; (iii) subtracting the give noise mean from the said difference, and squaring the obtained value; and (iv) generating a sum of the values obtained from (iii) for each of a plurality of said logo pixels; and then, (b) generating an average of the sum, and determining the stochastic measure $\sigma_d$ based on said average.

In above step (i), the method further includes the steps of initially detecting the logo area, and generating a map including a pixel pattern corresponding to the video frame, wherein each pixel in the pattern indicates whether the corresponding pixel in the video frame belongs to part of the logo or not. That map is used to select pixels of the video frame that are in the sub-image (i.e. logo) for processing as detailed above.

In another aspect the present invention provides a fade detection system for detecting fade in a logo in each of a sequence of frames, comprising: a detector for detecting the logo in a video frame; a logo map generator generating a map including a pixel pattern corresponding to the video frame, wherein each pixel in the pattern indicates whether the corresponding pixel in the video frame is in the logo; a logo tracker that detects logo fade by: using the map to select pixels of the video frame that are in the logo to, determine the difference between the value of the current pixel and that of a corresponding pixel in a reference frame, subtracting give noise mean from the difference and squaring the obtained value, and generate a sum of the squared said differences with noise mean subtracted for each of a plurality of logo pixels; generating an average of the sums; and comparing said average to a given noise level, such that if the difference between the said average and the noise level is greater than a threshold value then fade is detected.

Other objects, features and advantages of the present invention will be apparent from the following specification taken in conjunction with the following drawings.

BRIEF DESCRIPTION OF THE DRAWINGS

FIG. 3 shows a logo map by an example;

DETAILED DESCRIPTION OF THE INVENTION

As noted, because long time staying sub-images such as logos may cause problems such as screen burn on HDTV screens, it is highly desirable to detect and process the logos to prevent such problems. However, without prompt sensing of a logo's disappearance and ceasing processing of the detected logo area, annoying visual artifacts may occur. Hence, according to an embodiment of the present invention, not only the appearance, but also the disappearance of logos are detected.

As such, the present invention provides a method of sensing disappearance of the previously detected logos in noisy digital video signals. For example, when a video program starts, a short period of time is allowed to initially detect the existence and the shape and location of the logo within the incoming video frames. Once the logo is detected, a logo map is generated, and then a logo tracking process senses whether the logo remains in, or disappears from, the video frames. The logo map is generated according to the detected logo (shape and location) at the end of the initial logo detection period. Once generated, it is then applied to tracking the disappearance of the detected logo. If the logo moves or (partially) changes its intensity, color, pattern, etc., it will be sensed as having disappeared.

Figure 1:
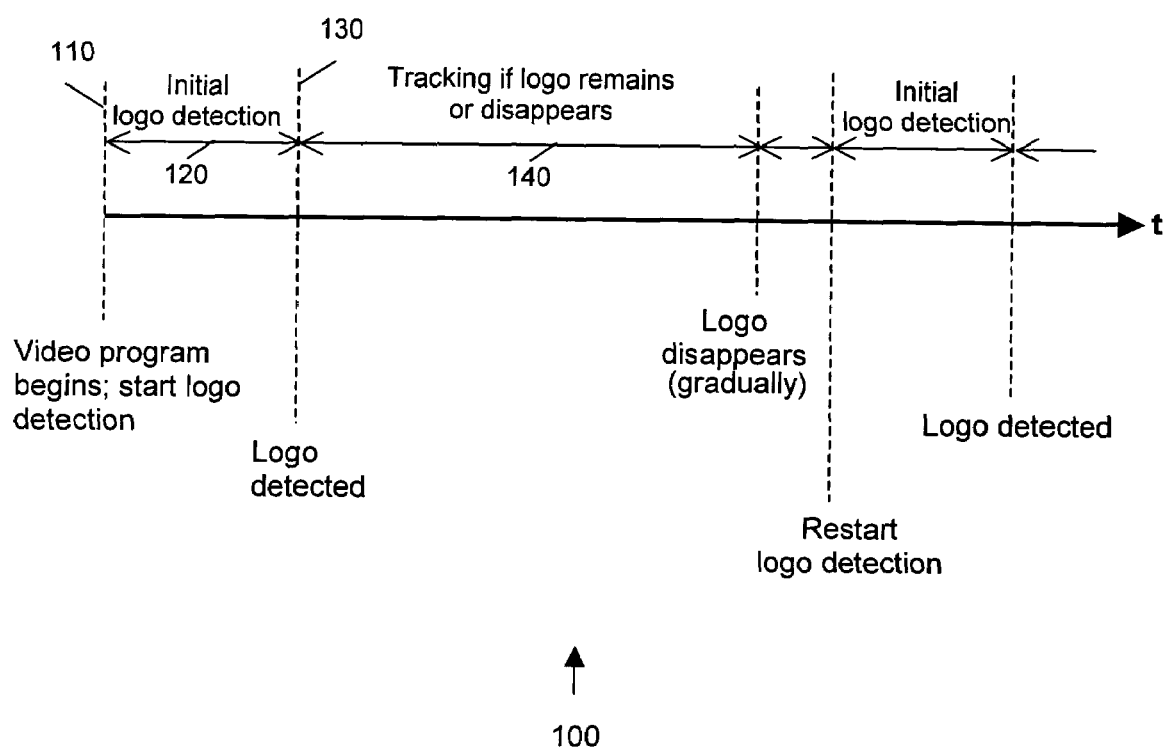
FIG. 1 is a diagramatic illustration of an example process of detecting and tracking logos during the playing of video programs, according to an embodiment of the present invention.

A logo can disappear from an image either abruptly or gradually (i.e., fade off). For a gradually disappearing logo, a sensing method according to the present invention senses fading of the logo at an early stage, and then reserves a short period of time to allow the logo to gradually fade off until it disappears. After the logo has disappeared, another initial logo detection period begins and the logo detection and tracking steps repeat until the video program ends (FIG. 1).

In one implementation, tracking and sensing disappearance of the detected logo is based on the logo map. The logo map can be viewed as a binary image, the same size as the image frame, wherein each pixel in the logo map corresponds to the pixel at the same location in the image frame. If a pixel value in the logo map is 1, the corresponding pixel in the image frame belongs to logo area; otherwise, if the pixel value in the logo map is 0, the corresponding pixel in the image frame belongs to the background video content. The logo map is generated by the logo detection module. Other logo detection methods can be utilized.

In addition to the logo map, a reference frame is utilized for logo tracking. The reference frame is used to calculate the pixel-by-pixel difference for each incoming frame. In one example, according to the present invention, the last frame used in the initial logo detection phase is used as the reference frame. As such, an incoming video frame is scanned pixel by pixel. Based on the logo map, if a pixel belongs to the detected logo (i.e., is in the logo area), the difference between that pixel and the corresponding pixel in the reference frame is calculated. Then the given noise mean is subtracted from the difference and the obtained value is squared. Otherwise, if the pixel does not belong to the logo, it is bypassed.

After at least a plurality of the pixels in the frame are so checked, the square of the |difference−noise mean| for all logo pixels are summed and averaged. Then the average is compared to the given noise level (represented by the standard deviation, i.e. STD). If they match well (i.e., the difference between the said average and the given noise level (STD) is less than the threshold), then the logo still remains in the current frame; otherwise, it has disappeared. The threshold is a pre-determined parameter for tolerating the measurement and computation errors.

As such, a second order, stochastic character/measure $\sigma_d$ of the pixel intensity value differences is utilized for tracking and sensing if the logo disappears from the image frames. The standard deviation of the noise is also utilized in sensing the disappearance of previously detected logo when the digital video signal is noisy. Therefore, the present invention is very reliable and robust when the digital video signals contain noise, even at considerably high levels.

FIG. 1 is a diagramatic illustration of an example process 100 of detecting and tracking logos within video images in time, according to the present invention. When a video program comprising multiple video image frames begins at time 110, a short time period 120 is allowed to initially detect the existence, the shape and the location of a logo within initial video frames. Once the logo is detected at time 130, a logo map is generated, and then during a time period 140 a logo tracking mechanism senses whether the detected logo remains or disappears from subsequent video frames.

Figure 2:
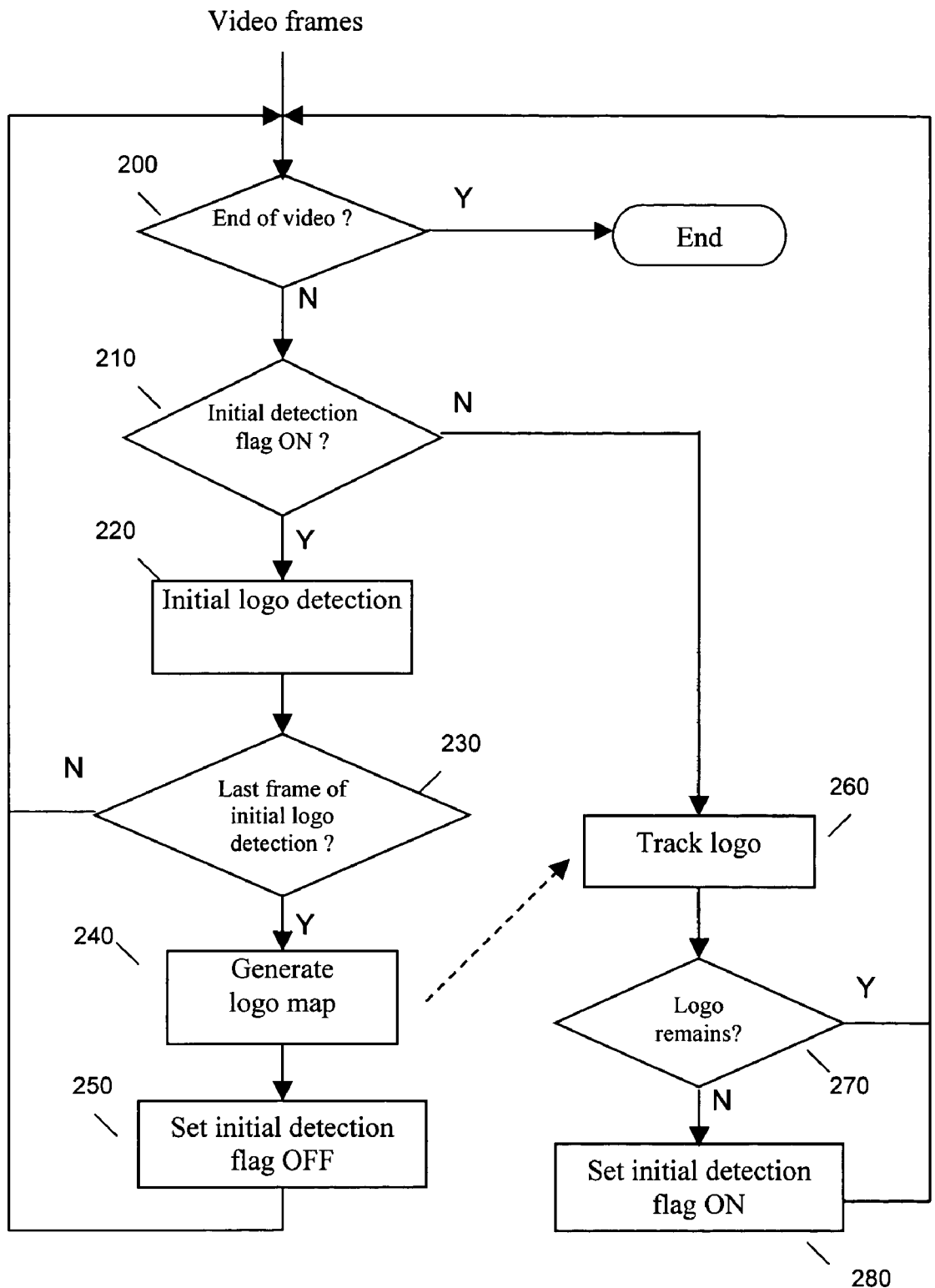
FIG. 2 shows an example flow chart of the steps of detecting and tracking logos within digital video program according to the present invention.

FIG. 2 illustrates a flowchart of example steps of detecting and tracking logos within a sequence of video frames, according to an embodiment of the present invention. The video frames are first checked to determine if the end of the video program has been reached (step 200). If yes, the process ends. Otherwise, it is determined if the initial logo detection time period has expired by examining a flag that was initially set to ON, to indicate the beginning of the detection time period (step 210). If not (i.e., the initial logo detection time period has not expired), the current video frame is passed to the initial logo detection module to detect a logo therein (step 220).

After determining that the last of a plurality of video frames have been examined during the initial detection time period (step 230), a logo map is generated (step 240), the aforementioned flag is set to OFF (step 250), and the process returns to step 200. If in step 210 the current video frame is read in after the initial detection time period has ended, then that current video frame is passed to the logo tracking module (step 260) for sensing if the logo remains in, or disappeared from, the current video frame (step 270). If the logo is not in the current video frame, then the initial detection flag is set back to ON (step 280) and the process returns to step 200 so that staring with the next incoming video frame, the logo is re-detected and the logo map is regenerated accordingly. The above process repeats until the video program ends. More details of tracking the logo are discussed in following.

Figure 3:
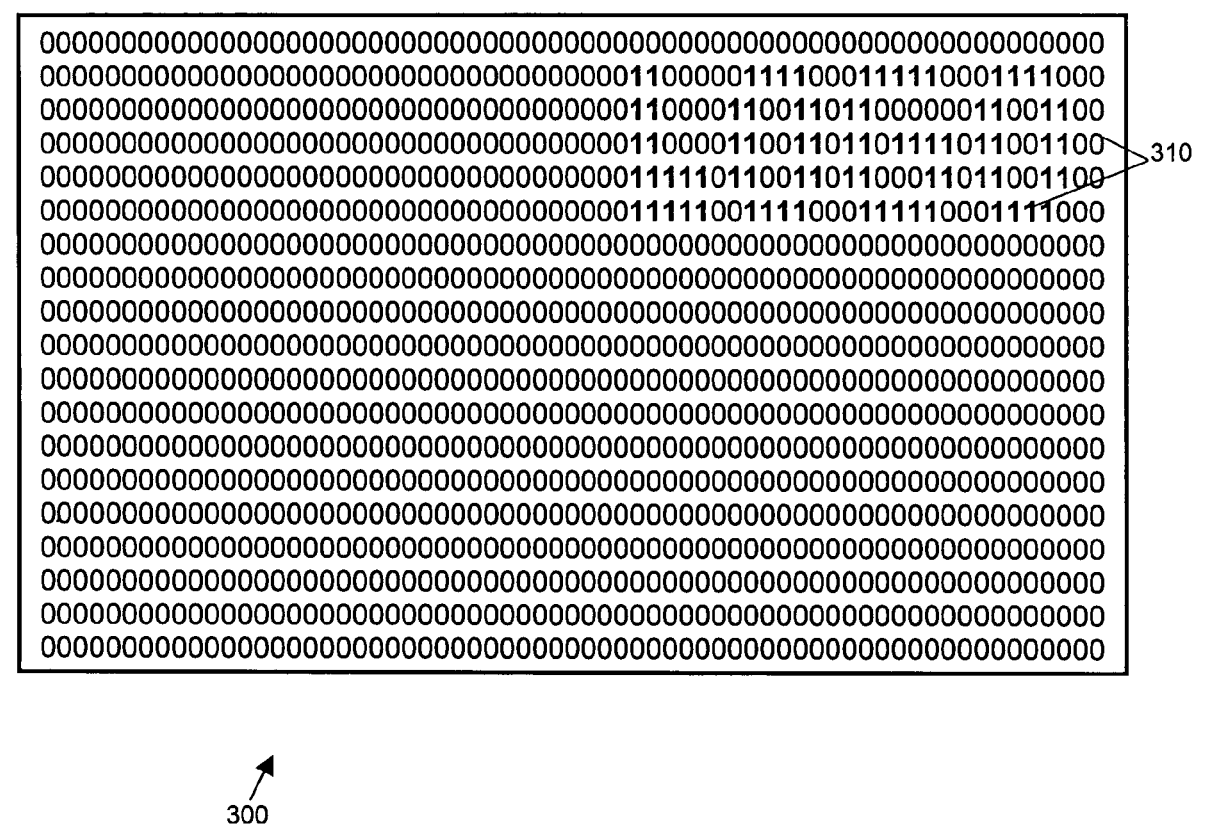

FIG. 3 shows an example of the logo map 300 that is utilized in logo tracking. The logo map 300 can be viewed as a binary image of the same size as a video image frame. In this binary logo map image 300, each pixel 310 has a binary value number (e.g., 0 or 1). Each binary number indicates whether the corresponding pixel in the current video frame belongs to a logo area (e.g., binary value number 1) or not (e.g., binary value number 0). In this example, the logo symbol spatially marked by the binary numbers is "LOGO".

Figure 4:
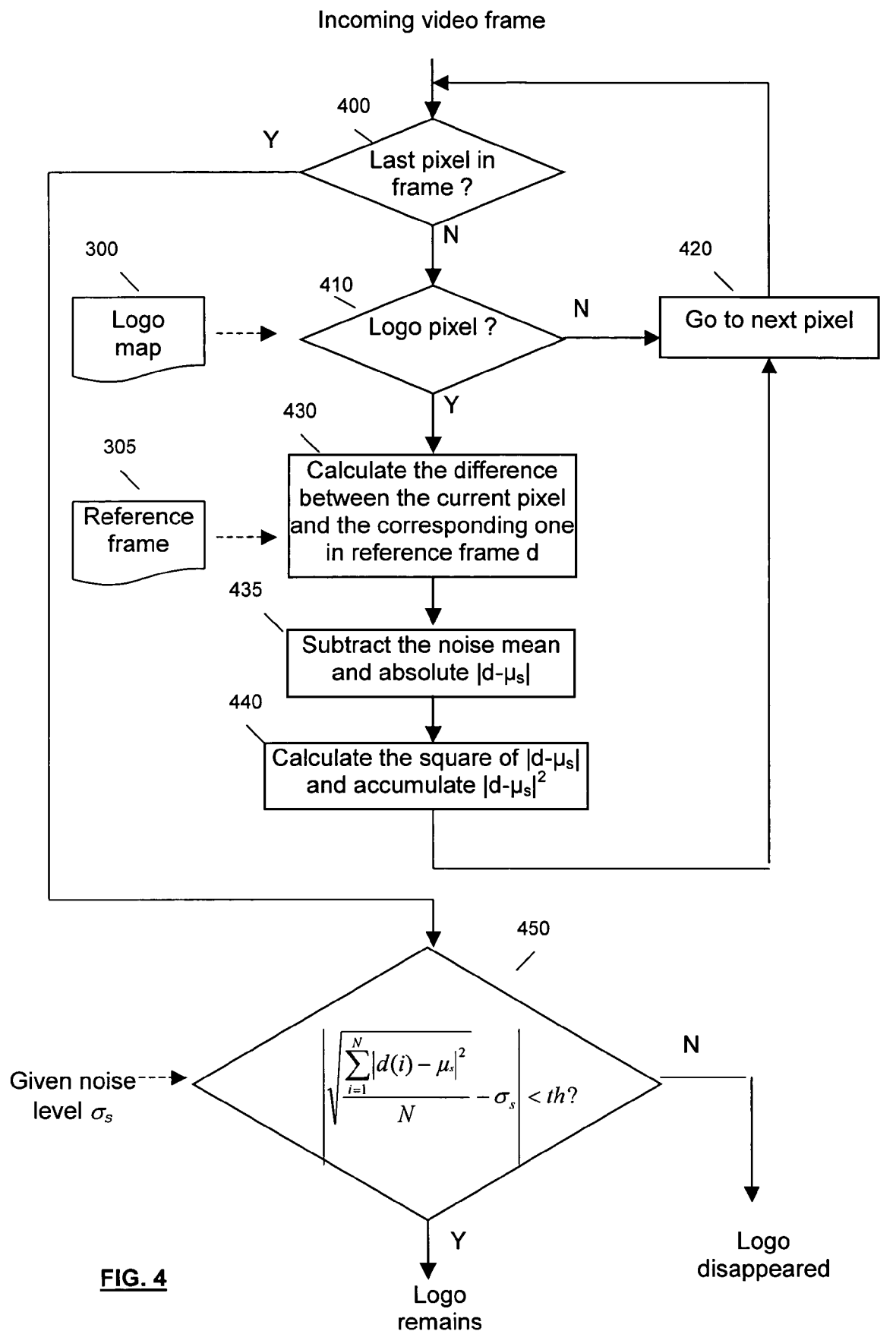
FIG. 4 shows an example flow chart of a method of tracking a previously detected logo according to the present invention.

FIG. 4 illustrates the steps of an example pixel-by-pixel process of sensing (detecting or determining) if the logo remains in, or has disappeared from, the current video frame. The sensing process utilizes the logo map 300, the reference frame 305 and a given noise level $\sigma_s$, to track the logo for the current video frame. The process begins with determining if a pixel under examination is the last pixel in the video frame (step 400). If not, then the logo map is examined to determine if the corresponding binary number in the logo map 300 indicates that this pixel is a logo pixel (step 410). If not, (i.e., the corresponding binary number is 0), then that pixel is bypassed (step 420) and the process returns to step 400. Otherwise (i.e., the pixel belongs to the logo area), the absolute difference between intensity of the pixel and the intensity of the corresponding pixel in the reference frame (with the same row and column coordinates) is computed (step 430), according to the relation:

$$d(i)=p_c(i)-p_r(i), \qquad (1)$$

where $p_c(i)$ denotes the pixel intensity value of the $i^{th}$ pixel in the current video frame, $p_r(i)$ denotes the corresponding pixel intensity value in the reference frame, and $d(i)$ is the difference of the two values.

Then the mean of the noise signal is subtracted from the difference as d'(i)=d(i)−$\mu_s$ (step 435). Then in step 440 the square of the absolute value of d'(i) is calculated and accumulated (from the first to the $i^{th}$ pixel) according to the relation:

$$\sigma_d^2(i) = \sum_{j=1}^{i} \{|d'(j)|^2 \mid f(j) = 1\} \qquad (2)$$

$$= \sum_{j=1}^{i} \{|d(j) - \mu_s|^2 \mid f(j) = 1\}$$

where f(j) denotes the binary number of the $j^{th}$ pixel in the logo map.

After all pixels in the current frame are examined, the summation of the squared differences (with noise mean subtracted, i.e. |d'|) are averaged according to the relation:

$$\sigma_d^2 = \frac{1}{M} \sum_{j=1}^{N} \{|d'(j)|^2 \mid f(j) = 1\} \qquad (3)$$

$$= \frac{1}{M} \sum_{j=1}^{N} \{|d(j) - \mu_s|^2 \mid f(j) = 1\}$$

where N denotes the total number of pixels in the current frame, and M represents the total number of logo pixels. As such the stochastic measure $\sigma_d$ is obtained as: $\sigma_d = \sqrt{\sigma_d^2}$.

Based on the example definition of (opaque) logos in the present invention, an unfading logo should remain constant (e.g., in intensity, color, shape, pattern, location, etc.) from frame to frame along the temporal axis. Thus, if p(i) is the intensity of a logo pixel i, then d(i) equals the noise s(i) for that pixel.

In general, a natural video noise signal can be modeled by a random process with mean according to the relation:

$$\mu_s = \frac{\sum_{i=1}^{M} s(i)}{M}, \text{ when } M \to \infty \qquad (4)$$

where M is the total number of noise samples. Therefore, the standard deviation (STD) of noise within the logo area can be expressed according to the relation:

$$\sigma_s = \sqrt{\frac{\sum_{i=1}^{M} |s(i) - \mu_s|^2}{M}}, \text{ when } M \to \infty. \qquad (5)$$

The current normal resolution for an HDTV is about 1280 by 720 pixels per image frame or higher. DVD resolution is generally 720 by 480, interlaced. Under those conditions, the total number of logo pixels is large enough to represent sufficient sample space of the stochastic process. Therefore, based on the above analysis, in step 450 (FIG. 4) the stochastic measurement ($\sigma_d$):

$$\sigma_d = \sqrt{\frac{\sum_{i=1}^{M} |d(i) - \mu_s|^2}{M}} \qquad (6)$$

is compared with the noise standard deviation $\sigma_s$, according to relations:

$$|\sigma_d - \sigma_s| < th? \qquad (7)$$

wherein if $|\sigma_d - \sigma_s|$<threshold th, then the logo remains in the current video frame; Otherwise, the logo has disappeared. Note that in the above relation (6), the term d(i) is based only logo pixels, and M is the total number of logo pixels.

As such, the previously detected logo is tracked within digital video signals that may be noisy, by: calculating the stochastic measurement ($\sigma_d$) of the logo area by computing the standard deviation of logo pixel intensity difference, and sensing if a logo remains in a video frame or has disappeared (or starts to fade off) by comparing the $\sigma_d$ of the logo with given noise signal levels measured by standard deviation.

Figure 5:
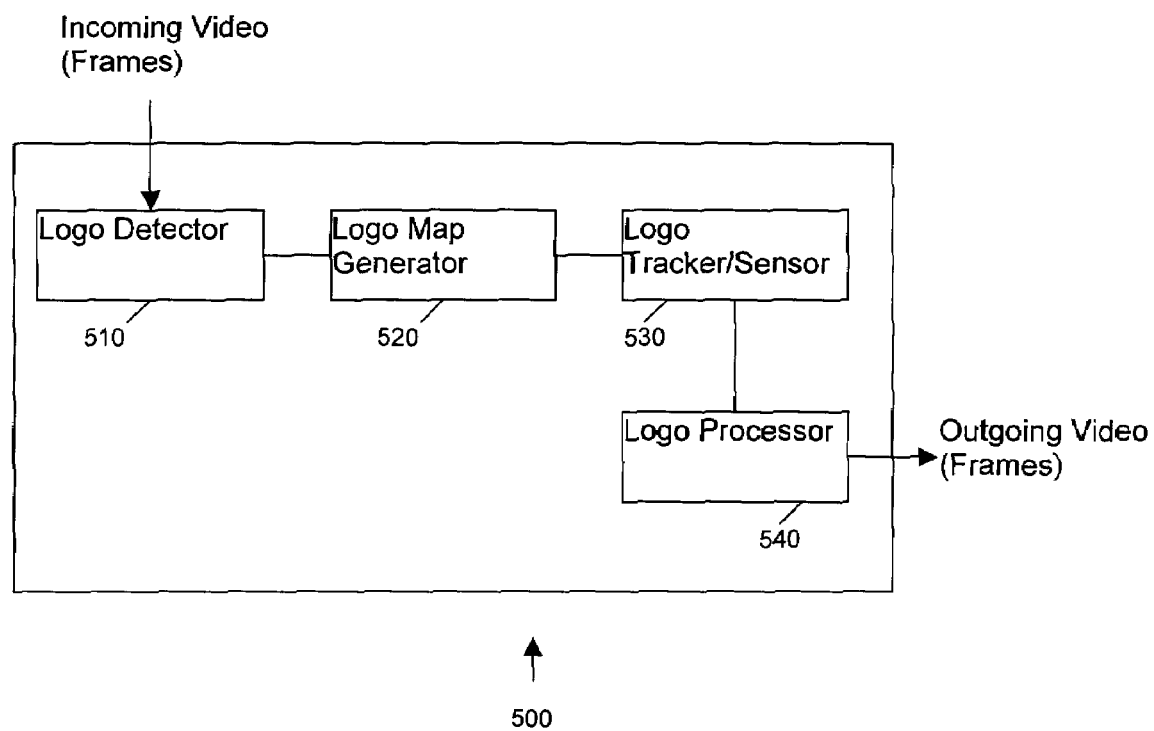
FIG. 5 shows an example block diagram of an embodiment of a logo detection and system according to the present invention.

Referring to FIG. 5, in another aspect, such a logo detection and tracking method according to the present invention is implemented in a logo detection and system 500, comprising a logo detector 510, a logo map generator 520, a logo tracker/sensor 530 and a logo processor 540. The logo detector 510, the logo map generator 520 and the logo tracker/sensor 530 in the example architectural block diagram of system 500 implement the example steps described above. Further, the logo processor 540 can be designed to process a video frame including a logo in a desired fashion (i.e., remove the logo, move the logo, etc.). Other implementations are possible.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned system 500 according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detecting fade in an area of each of a sequence of frames comprising pixels that represent digital video images, comprising:
    calculating a stochastic measure $\sigma_d$ of the area based on a standard deviation of pixel value differences in at least two frames among the sequence of frames; and
    detecting the fade in said area by calculating a difference between the stochastic measure $\sigma_d$ and a given noise level, such that if the difference is greater than a threshold value then fade is detected.

2. The method of claim 1, wherein the area comprises a logo area, and wherein calculating the stochastic measurement $\sigma_d$ further comprises:

(a) for each pixel in the logo area in a current frame:
  (i) determining a difference between a value of a current pixel and that of a corresponding pixel in a reference frame,
  (ii) subtracting a mean value of the given noise level from the said difference and squaring the obtained value; and
  (iii) generating a sum of the squared differences with noise mean subtracted for each of a plurality of pixels within the logo area;
(b) generating an average of the sums, and determining the stochastic measure $\sigma_d$ based on said average.

3. The method of claim 2, wherein generating said sum is according:

$$\sigma_d^2(i) = \sum_{j=1}^{i} \{|d'(j)|^2 \mid f(j) = 1\}$$
$$= \sum_{j=1}^{i} \{|d(j) - \mu_s|^2 \mid f(j) = 1\}$$

such that:
$$d(j) = p_c(j) - p_r(j)$$

wherein:
  i is the number of pixels that have been examined in the current frame,
  $P_c(J)$ denotes the pixel value in the current frame,
  $P_r(i)$ denotes the corresponding pixel value in the reference frame,
  d(j) denotes the difference between the value of the current pixel and that of a corresponding pixel in the reference frame,
  f(j)=1 denotes the pixel being a logo pixel, and
  $\mu_s$ denotes the mean of the noise signal.

4. The method of claim 3, wherein calculating the stochastic measure $\sigma_d$ is according to:

$$\sigma_d = \sqrt{\sigma_d^2}, \text{ and}$$
$$\sigma_d^2 = \frac{1}{M} \sum_{j=1}^{N} \{|d'(j)|^2 \mid f(j) = 1\}$$
$$= \frac{1}{M} \sum_{j=1}^{N} \{|d(j) - \mu_s|^2 \mid f(j) = 1\}$$

wherein:
  M denotes the total number of pixels in said logo area, and
  N denotes the total number of pixels in the current frame.

5. The method of claim 2, wherein:
said area includes a sub-image; and wherein the method further comprises:
  initially detecting the area including the sub-image, and
  generating a map including a pixel pattern corresponding to the current frame, wherein each pixel in the pixel pattern indicates whether the corresponding pixel in the current frame is in the sub-image.

6. The method of claim 5, further comprising:
using the map to select pixels of the current frame that are in the sub-image for:
  determining the difference between the value of the current pixel and that of a corresponding pixel in a reference frame, subtracting the noise mean from the difference and squaring the obtained value; and
  generating a sum of the squared values for each of a plurality of pixels within said logo area.

7. The method of claim 1, wherein the noise level is obtained by determining a standard deviation, $\sigma_s$, of noise samples s(i) from the video images, wherein i is the index of a digital noise sample.

8. The method of claim 7, wherein $\sigma_s$, within said area, is expressed as:

$$\sigma_s = \sqrt{\frac{\sum_{i=1}^{M} |s(i) - \mu_s|^2}{M}}, \text{ when } M \to \infty$$

wherein the noise samples comprise a natural video noise modeled by a random process, the noise samples having a mean value of:

$$\mu_s = \frac{\sum_{i=1}^{M} s(i)}{M}, \text{ when } M \to \infty$$

wherein M is the total number of noise samples.

9. A method of detecting fade of a logo in a sequence of digital video frames comprising pixels, comprising:
(a) for each pixel in a logo area of a current frame:
  (i) determining a difference between a value of a current pixel and that of a corresponding pixel in a reference frame;
  (ii) subtracting a mean of a given noise from the said difference and squaring the obtained value; and
  (iii) generating a sum of the squared differences with the noise mean subtracted for each of a plurality of pixels within the logo area;
(b) generating an average of the sums;
(c) comparing said average with a level of the given noise characterized by a standard deviation, such that if a difference between the average and the noise standard deviation is greater than a threshold value then fade is detected.

10. The method of claim 9, further comprising:
detecting the logo in the current frame, and
generating a map including a pixel pattern corresponding to the current frame, wherein each pixel in the pixel pattern indicates whether the corresponding pixel in the current frame is in the logo.

11. The method of claim 10, further comprising:
using the map to select pixels of the current frame in the logo area for:
  determining the difference between the value of the current pixel and that of a corresponding pixel in a reference frame;
  subtracting the noise mean from said difference, and squaring the obtained value; and
  generating a sum of said squared values for each of the selected pixels.

12. The method of claim 9, wherein the standard deviation characterizing the given noise level is a standard deviation of noise samples from the video frames.

13. The method of claim 12, wherein the given noise level is determined from a standard deviation of noise samples within the logo area.

14. A fade detection system for detecting fade in a logo in each of a sequence of video frames, comprising:
   a detector for detecting the logo in one of the video frames;
   a logo map generator for generating a map including a pixel pattern corresponding to the video frame, wherein each pixel in the pixel pattern indicates whether the corresponding pixel in the video frame is in the logo; and
   a logo tracker that detects logo fade by:
      using the map to select pixels in the logo from the video frame to determine a difference between a value of the current pixel and a value of a corresponding pixel in a reference frame,
      subtracting a given noise mean from the said difference and squaring the obtained value, and
      generate a sum of the squared values for each of a plurality of pixels within the logo area;
      generating an average of the sums; and
      comparing said average with a given noise level, such that if a difference between the said average and the given noise level is greater than the threshold value then fade is detected.

15. The system of claim 14, wherein the given noise level is determined by a standard deviation of noise samples from the video frames.

16. The system of claim 15, wherein the given noise level is determined by a standard deviation of noise samples from pixels in the logo.

17. A fade detection system for detecting fade in a logo in each of a sequence of frames, comprising:
   a detector for detecting the logo in one of the frames;
   a logo tracker that calculates a stochastic measure $\sigma_d$ of said logo based on a standard deviation of differences in pixel values in at least two of said frames, and detects fade in said logo by comparing $\sigma_d$ with a given noise level such that if the difference between $\sigma_d$ and the given noise level is greater than a threshold value then fade is detected.

18. The system of claim 17, wherein the tracker calculates the stochastic measurement $\sigma_d$ by:
   (a) for each pixel in a logo area of a current frame:
      (i) determining a difference between a value of a current pixel and that of a corresponding pixel in a reference frame;
      (ii) subtracting a mean of the given noise level from the said difference, and squaring the obtained value; and
      (ii) generating a sum of the squared values for each of a plurality of pixels in the logo area;
   (b) generating an average of the sums, and determining the $\sigma_d$ based on said average.

19. The system of claim 18, wherein the tracker generates said sum of the squared values, with noise mean subtracted, according to:

$$\sigma_d^2(i) = \sum_{j=1}^{i} \{|d'(j)|^2 \mid f(j) = 1\}$$

$$= \sum_{j=1}^{i} \{|d(j) - \mu_s|^2 \mid f(j) = 1\}$$

such that:
$$d(j) = p_c(j) - p_r(j)$$

wherein:
   $P_c(J)$ denotes the pixel value in the current frame,
   $P_r(i)$ denotes the corresponding pixel value in the reference frame,
   d(j) denotes the difference between the value of the current pixel and that of a corresponding pixel in the reference frame,
   f(j)=1 denotes that the pixel is a logo pixel, and
   $\mu_s$ denotes the mean of the given noise level.

20. The system of claim 19, wherein the tracker determines the $\sigma_d$ according to:

$$\sigma_d = \sqrt{\sigma_d^2}, \text{ and}$$

$$\sigma_d^2 = \frac{1}{M} \sum_{j=1}^{N} \{|d'(j)|^2 \mid f(i) = 1\}$$

$$= \frac{1}{M} \sum_{j=1}^{N} \{|d(j) - \mu_s|^2 \mid f(i) = 1\}$$

wherein:
   M denotes the total number of pixels in said log area, and
   N denotes the total number of pixels in the current frame.

21. The system of claim 18, further comprising a logo map generator that generates a map including a pixel pattern corresponding to the current frame, wherein each pixel in the pixel pattern indicates whether the corresponding pixel in the current frame is in the logo.

22. The system of claim 21, wherein the tracker uses the map to select pixels of the current video frame that are in a sub-image for:
   determining the difference between the value of the current pixel and that of a corresponding pixel in a reference frame, subtracting the noise mean from the said difference and squaring the obtained value; and
   generating a sum of the squared values for each of a plurality of pixels within the logo area.

23. The system of claim 17, wherein the given noise level is determined by a standard deviation, $\sigma_s$ of noise samples s(i) from the frames.

24. The system of claim 23, wherein $\sigma_s$ within said area, is expressed as:

$$\sigma_s = \sqrt{\frac{\sum_{i=1}^{M} |s(i) - \mu_s|^2}{M}}, \text{ when } M \to \infty$$

wherein a natural video noise signal is modeled by a random process having a mean:

$$\mu_s = \frac{\sum_{i=1}^{M} s(i)}{M}, \text{ when } M \to \infty$$

wherein M is the total number of noise samples.

25. The method of claim 1, further comprising restarting an initial logo detection and tracking process after detecting the gradual fade and after a short period of time to allow the logo to gradually fade off until the logo disappears.

26. The method of claim 10, wherein the map comprises pixel values of 1's and 0's, with the 1's corresponding to the detected logo area and the 0's corresponding to background video content.

27. The method of claim 1, wherein the fade is a gradual fade.

* * * * *